United States Patent [19]

Takahashi et al.

[11] Patent Number: 5,326,658
[45] Date of Patent: Jul. 5, 1994

[54] LITHIUM SECONDARY BATTERY USING A NON-AQUEOUS SOLVENT

[75] Inventors: Yuzuru Takahashi; Kenichi Nakamura; Jitsuo Oishi; Hiroaki Shigeta, all of Tsukuba, Japan

[73] Assignee: Mitsubishi Gas Chemical Company, Inc., Tokyo, Japan

[21] Appl. No.: 992,174

[22] Filed: Dec. 17, 1992

[30] Foreign Application Priority Data

Dec. 17, 1991 [JP] Japan .................................. 3-353225
Feb. 4, 1992 [JP] Japan .................................. 4-47938
Aug. 28, 1992 [JP] Japan .................................. 4-230070

[51] Int. Cl.$^5$ ........................ H01M 4/36; C10B 31/00
[52] U.S. Cl. .................................. 429/194; 429/218; 423/445 R; 423/448; 264/29.1
[58] Field of Search ............... 429/194, 196, 197, 218; 423/445, 448; 264/29.1; 252/182.1, 502

[56] References Cited

U.S. PATENT DOCUMENTS

| | | |
|---|---|---|
| 4,423,125 | 12/1983 | Basu . |
| 4,615,959 | 10/1986 | Hayashi et al. ...................... 429/194 |
| 4,668,595 | 5/1987 | Yoshino et al. ...................... 429/194 |
| 4,702,977 | 10/1987 | Hiratsuka et al. ................... 429/194 |
| 4,725,422 | 2/1988 | Miyabayashi et al. . |
| 5,093,216 | 3/1992 | Azuma et al. . |

FOREIGN PATENT DOCUMENTS

| | | |
|---|---|---|
| 57-208079 | 12/1982 | Japan . |
| 58-93176 | 6/1983 | Japan . |
| 58-102464 | 6/1983 | Japan . |
| 60-54181 | 3/1985 | Japan . |
| 60-221973 | 11/1985 | Japan . |
| 3-137010 | 6/1991 | Japan . |

*Primary Examiner*—Anthony Skapars
*Attorney, Agent, or Firm*—Leydig, Voit & Mayer

[57] ABSTRACT

The invention provides for a lithium secondary battery using a non-aqueous solvent wherein the anode material is prepared by the pyrolysis of organic compound starting materials obtained by reacting at least one conjugated polycyclic compound with a nitro compound or with a nitrating agent. The anode material contains at least the elements carbon and nitrogen, the nitrogen content ranging from 0.5% to 6% by weight. Eighty percent or more of this nitrogen is bound to carbon by either C—N or C=N bonds. The ratio of the intensity of the x-ray photoelectron spectroscopy ("XPS") peak observed for the anode material at 401.2±0.2 eV to the intensity of peak observed for the anode material at 398.8±0.4 eV is 1.0:1 or more.

11 Claims, No Drawings

LITHIUM SECONDARY BATTERY USING A NON-AQUEOUS SOLVENT

BACKGROUND OF THE INVENTION

1. Field of the Invention

The present invention relates to an improved lithium secondary battery with a large capacity and superior charge - discharge cycle characteristics.

2. Description of the Prior Art

Lithium primary batteries using metallic lithium as the anode material, because of such advantages as high energy. density, light weight, small size and the ability to function well after long storage, have already been put into practical use in a variety of applications.

However, when lithium metal, which is so effective as an anode material for lithium primary batteries, is used as the anode material for a secondary battery, various new problems arise that were not foreseeable in the primary battery, and, consequently, it has not been possible to put lithium metal into practical use as the anode of a lithium secondary battery. The reason is that lithium secondary batteries having a lithium metal anode possess such serious flaws or defects as short charge - discharge cycle lifetimes and low charge - discharge efficiency. These flaws or defects are caused by the deterioration of the anode arising from an electrochemical reaction in which lithium metal is separated from solution by charging and discharging in the form of dendrites growing on the anode. In lithium secondary batteries possessing a lithium metal anode, it is not possible to avoid this kind of deterioration of the anode.

As stated above, when lithium metal is used as the anode of a secondary battery, the battery suffers from the defect of deterioration of the anode, and methods for using lithium - aluminum alloys as the anode material have been proposed to overcome this defect. Batteries prepared by these methods are at present widely used in such applications as memory backup for various small scale electronic devices. However, the danger originating in the use of lithium metal as a secondary battery anode is intrinsic to lithium metal, and there are serious problems involved in the application of such lithium aluminum alloy anode secondary batteries to such fields as power sources for portable electronic equipment that require a high capacity and in which nickel - cadmium batteries are presently used.

In addition, various secondary batteries having anodes made of carbon materials that occlude lithium ion have been proposed in place of batteries having anodes made of lithium metal.

For example, methods of using graphite as a lithium secondary battery anode material were disclosed in U.S. Pat. No. 4,304,825, Japanese Laid Open Patent Application No. 208079/1982, U.S. Pat. No. 4,423,125 and Japanese Laid Open Patent Application No. 102464/1983. However, since graphite crystallites are extensively developed, the destruction of the graphite crystalline structure occurs during the intercalation and deintercalation of lithium, and, as a result, the reversibility of intercalation-deintercalation is limited. Additionally, these batteries exhibit such defects as a large magnitude of self discharge and the decomposition of the electrolyte due to the high reactivity of lithium - graphite intercalation compounds. Consequently, such batteries are not applicable to practical use.

On the other hand, the use as a lithium secondary battery anode material of activated carbon, which is a carbon material possessing a high surface area, is disclosed in U.S. Pat. No. 4,497,883 et al. That patent discloses a device that makes use of electric double layer formation based on the high surface area of activated carbon However, the secondary batteries of that patent, which use the described activated carbon material as the anode, possess such defects as low charge - discharge efficiency and low battery voltage.

In order to solve these kinds of problems, the use as the anode material of carbon materials that differ both from graphite with its extensively developed crystallites and activated carbon with its high surface area has been proposed. In particular, the definition of carbon materials in terms of the pyrolysis temperatures used in their formation has been proposed, and a method for using pyrolyzed organic compounds obtained by heating organic compounds at temperatures of 1500° C. or less as secondary battery anode materials is disclosed in Japanese Laid Open Patent Application No. 93176/1983 and U.S. Pat. No. 4,615,959. Moreover, the use of carbon fibers obtained by pyrolysis at around 2000° C. as anode material is disclosed in Japanese Laid Open Patent Application No. 54181/1985, and, additionally, the use of carbon materials containing graphite structure and prepared by pyrolysis at temperatures ranging from 1000° C. to 2500° C. is disclosed in Japanese Laid Open Patent Application No. 221973/1985. On the other hand, the definition of carbon materials in terms of the values of their physical properties has also been proposed. For example, the use of a carbon material having a pseudographite structure in which the x-ray diffraction values for the interlayer spacing of carbon atoms (d002) and the size of the crystallites in the direction of the c axis (Lc002) are $3.39 \text{Å} \leq d002 \leq 3.75$ Å and $8 \text{ Å} \leq Lc002 \leq 100$ Å respectively is disclosed in U.S. Pat. No. 4,702,977. Moreover, a method for using carbon materials that possess a surface area A ($m^2/g$) having a range of $0.1 < A < 100$ and Lc002 and true density $\rho$ ($g/cm^3$) values that simultaneously satisfy the conditions that $1.70 < P < 2.18$ and $10 < Lc002 < 120\rho - 189$ as anode materials is disclosed in U.S. Pat. No. 4,668,595. However, although the use of the carbon materials disclosed in the above patents and patent applications represents a significant improvement over the use of the above mentioned graphite and activated carbon, the battery capacity of batteries made with these carbon materials, particularly the capacity when the battery voltage is high, is still not adequate.

As the situation is understood, there has been a long-felt need by industry to provide anode materials that impart to the batteries made therefrom high capacity, specifically in excess of 500 mAh/g, and that exhibit superior characteristics in the constant potential region, that region in the anode charge - discharge curve (mAh/g versus potential) that is relatively flat and low in potential, and there have been substantial efforts by many people working in this field in recent years. Yet, despite all of this prior effort and the need for such an improved anode material, it has been left to the inventors of the present invention to provide a material that will satisfy this need.

SUMMARY OF THE INVENTION

As stated above, lithium secondary batteries using carbon materials as the anode material proposed up to the present time have not been able to exhibit characteristically large capacity.

The present invention overcomes the problems associated with the prior art lithium secondary batteries. The battery of the present invention possesses a large capacity, and, through the improvement of charge-discharge characteristics, the present invention offers a lithium secondary battery with excellent safety and stability. Thus, in accordance with the present invention, a lithium secondary battery is provided which utilizes as the anode material a material prepared by the pyrolysis of a starting material which was, in turn, obtained by reacting at least one conjugated polycyclic compound with a nitrocompound or with a nitrating agent. Desirable anode materials thus contain nitrogen contents of from about 0.5% by weight to 6% by weight wherein at least 80% of the nitrogen is bound to carbon by either C—N or C=N bonds.

DETAILED DESCRIPTION OF THE PREFERRED EMBODIMENTS

The inventors of the present invention, in order to achieve the goals stated above, examined the various carbon materials known to the prior art. As a result, they came to the conclusion that although such characteristics as the pyrolysis temperature of the carbon materials and the degree of crystallinity or the surface area could be varied, the optimum values from the standpoint of anode characteristics had been determined and a substantial improvement could not be expected based upon further variation of these characteristics.

However, the inventors were able to discover among the anode materials made from pyrolyzed organic compounds containing nitrogen an anode material having a capacity surpassing 372 mAh/g, the theoretical capacity of lithium graphite intercalation compounds ($LiC_6$). In particular, from among the pyrolysis products of polyacrylonitrile (PAN), they discovered an anode material having a capacity of 400 mAh/g. Moreover, when the x-ray diffraction spectra of these carbon materials were taken, after lithium ion had been occluded into them, they differed from those of graphite, and the spectra assigned to the $LiC_6$ compound were not observed.

In accordance with a principal aspect of the present invention, it has been discovered that highly advantageous anode materials are obtained when carbon materials are provided having a certain specific percentage of nitrogen atoms and at least a predominance of a specific type of chemical bonding between the nitrogen and carbon atoms. It has been further discovered that such highly advantageous anode materials can be prepared by pyrolyzing organic compound starting materials obtained by reacting conjugated polycyclic compounds such as, for example, pitch, with a nitrocompound or with a nitrating agent. Such anode materials impart to the resulting battery highly desirable performance characteristics, including an increase in capacity utilizing, it is believed, a principal mechanism of lithium occlusion which differs from that of lithium-graphite intercalation. Using these new carbon materials as anode materials, a very high performance lithium secondary battery can be made, and the goals of the present invention are achieved.

The organic compound starting materials used to prepare the lithium secondary battery anode material of the present invention are obtained by the reaction of conjugated polycyclic compounds with a nitrating agent or a nitrocompound so that the ratio (N/C) of the number of nitrogen atoms to the number of carbon atoms in the organic compound starting material ranges from 0.01:1 to 0.3:1 and the ratio (N/O) of the number of nitrogen atoms to the number of oxygen atoms in the organic compound starting material ranges from 0.1:1 to 3.0:1.0 respectively.

The conjugated polycyclic compounds used in present invention are any conjugated polycyclic compounds that react with nitrocompounds or nitrating agents to produce the organic compound starting materials used in the present invention. Naphthalene, anthracene, pyrene, coronene and higher molecular weight compounds of similar structure, the foregoing compounds substituted with organic species including alkyl groups or phenyl groups and the like, such as methyl naphthalene, two or more of any of the foregoing compounds joined together by single or double bonds or bridged by an organic group, such as dinaphthylethylene, any of the foregoing species containing one or more heteroatom species such as nitrogen or oxygen, mixtures or combinations of the foregoing, tar, coal, petroleum pitch, synthetic pitch or similar heavy oils may be used as the conjugated polycyclic compound used in the present invention. Of these conjugated polycyclic compounds, synthetic pitches having a softening point of 170° C. or less and tar are preferred. Moreover, any reaction method that results in the production of the aforementioned organic compound starting material may be used. For example, when naphthalene is used as the conjugated polycyclic compound, the method whereby it is first reacted using $HFBF_3$ to form a pitch with a softening point of 170° C. or less which is then reacted with a nitrocompound or a nitrating agent is preferred. Moreover, when tar is used as the conjugated polycyclic compound, it is reacted with a nitrating agent or a nitrocompound to produce the organic compound starting material used in the present invention. Nitrohumic acid, the product of the nitration of coal with a nitrating agent, can also be used as the organic compound starting material used in the present invention.

As the nitrating agent used in the present invention, various methods for nitrating organic compounds using inorganic nitrating agents are well known and, when reacted with the conjugated polycyclic compound used in the present invention, may be utilized to provide the organic compound starting materials having the desired characteristics previously described herein. For example, it is possible to carry out nitration using nitric acid and sulfuric acid or nitric acid and acetic anhydride as the nitrating agent. Moreover, nitration can be performed using nitrogen dioxide gas and ozone gas together in oxygen or in air. The nitrated conjugated polycyclic compounds obtained are washed with water to remove acid and then dried before being pyrolyzed.

The ratio of the amount of nitrating agent used to the amount of conjugated polycyclic compound used may be any ratio that results in the production of an organic compound starting material having the aforementioned characteristics and, as an example, where a 50% by weight mixture of concentrated nitric acid and concentrated sulfuric acid is used as the nitrating agent, it may be reacted with the conjugated polycyclic compound in ratios ranging from 5:1 to 100:1 by weight of nitrating agent to conjugated polycyclic compound. Any reaction conditions that result in the production of the organic compound starting materials used in the present invention may be used for the nitration. For example, when the 50% by weight mixture of weight concentrated nitric acid and concentrated sulfuric acid is used as the nitrating agent and pitch is used as the conjugated polycyclic compound, reaction temperatures on the order of 50° C. to 80° C. are preferred.

As the nitrocompound used in the present invention, any nitrocompound that can be reacted with conjugated polycyclic compounds, to produce organic compounds having the aforementioned characteristics may be used. However, aromatic nitrocompounds such as dinitronaphthalene and nitrohumic acid are preferred and dinitronaphthalene is particularly preferred. The ratio of the amount of nitrocompound reacted with the conjugated polycyclic compound to the amount of conjugated polycyclic compound may be any ratio that results in the production of an organic compound starting material having the aforementioned desired characteristics and, as an example, where dinitronaphthalene is the nitrocompound, it may be reacted with the conjugated polycyclic compound in ratios ranging from 0.1:1 to 3:1 by weight depending upon the nitrogen and oxygen content of the reactants. Any reaction temperature that results in the production of the organic compound starting material used in the present invention may be used. However, reaction temperatures on the order of 200° C. to 600° C. are preferred.

The carbon materials used as the anode material of the present invention are obtained by pyrolyzing the organic compound starting materials used in the present invention under an atmosphere of inert gas. These carbon materials contain nitrogen in amounts ranging from 0.5% to 6% by weight and preferably from 1% to !5% by weight. In addition, the majority of this nitrogen is represented in x-ray photoelectron spectra ("XPS") by two Nitrogen 1s ("N-1s") peaks that appear in the vicinity of 399 eV-more precisely within the range of $398.8\pm0.4$ eV - and in the vicinity of 401 eV - more precisely within the range of $401.2\pm0.2$ eV- respectively[i] The exact positions of these peaks are derived from the nature of the bonding between carbon and nitrogen. 80% or more of all of the chemical bonds of nitrogen contained in the anode material of the present invention are represented by peaks in the vicinity of binding energies of 399 eV and 401 eV. The d002 interlayer spacing of the carbon material that may be used as the anode material of the present invention which serves as the parameter for the degree of crystallization of carbon materials depends upon the carbon conditions of the reactions used to prepare them, but it preferably ranges from 3.4 Å to 3.7 Å and the crystallite size, Lc002, is 70 Å or less. Moreover, the true density of the carbon materials of the present invention ranges from 1.5 $g/cm^3$ to 2.0 $g/cm^3$. In addition, when $^7Li$ nuclear magnetic resonance (NMR) spectra are taken of carbon materials of the present invention that have been made to occlude lithium, a peak is observed between about 20 ppm and about 35 ppm.

X-ray diffraction spectra corresponding to those of lithium-graphite intercalation compounds are not observed when lithium ion is occluded by the carbon materials of the present invention, just as they were not observed in the case of occlusion by pyrolyzed materials made from PAN, and, consequently, $LiC_6$ compounds such as those disclosed in U.S. Pat. No. 4,423,125 were not observed to have been formed. Moreover, since the capacities of the carbon material used in the present invention are in the range of from 500 mAh/g to 600 mAh/g which surpasses the 372 mAh/g theoretical capacity of $LiC_6$, this suggests that, although the mechanism of lithium ion occlusion is unclear, a mechanism other than that involved in the intercalation of graphite by lithium is involved in the occlusion of lithium ion by the carbon materials of the present invention. It is thought from the value of the $^7Li$ Knight shift that, compared with graphite, the carbon materials of the present invention occlude lithium with relative ease as lithium ion.

Moreover, with regard to the use of nitrogen containing carbon materials similar to those of the carbon materials of the present invention as anode materials, the use of carbon materials obtained by carbonizing nitrogen containing high polymer compounds such as PAN is disclosed in Japanese Laid Open Patent Application No. 93176/1983, Japanese Laid Open Patent Application No. 54181/1985, Japanese Laid Open Patent Application No. 221973/1985, U.S. Pat. No. 4,615,959, U.S. Pat. No. 4,668,595 and U.S. Pat. No. 4,702,977. In addition, the use of carbon materials obtained by carbonizing pitch as anode materials is disclosed in U.S. Pat. No. 4,615,959, U.S. Pat. No. 4,668,595 and U.S. Pat. No. 4,702,977, and, more particularly, the use of pitch obtained by heat treatment of tetrabenzophenazine as the precursor organic compound for anode material is disclosed in U.S. Pat. No. 4,668,595. However, among the anode materials obtained by these methods, none exhibit capacities that exceed the capacity of approximately 400 mAh/g obtained with the carbonization product of PAN. By the methods used in the present invention, in which the compound obtained by the reaction of a conjugated polycyclic compound with a nitrocompound or a nitration agent is pyrolyzed to produce the anode material, it has become possible to obtain carbon materials with a capacity ranging from 500 mAh/g to 600 mAh/g. Carbon materials obtained in this way possess various superior characteristics for anodes. In particular, the capacity of these anode materials is significantly larger than the capacity of prior art carbon materials, and, within the range of potential of 0 V to 3 V with reference to Li, capacities of more than 500 mAh/g are possible. Moreover, between 0 V and 0.5 V, capacities of 400 mAh/g or more are possible.

In the carbonization methods of the prior art, it was necessary to conduct pyrolysis after oxidation of the starting materials, the organic compound starting materials used in the present invention are pyrolyzed without oxidation. Any pyrolysis procedure that results in the above described carbon materials of the present invention may be used, and a variety of suitable methods are known to the prior art. A preliminary pyrolysis may be carried out at 800° C. The pyrolysis conditions preferred for the preparation of the carbon material used in the present invention include pyrolysis temperatures in the range of from 800° C. to 1800° C. and a pyrolysis time of from 1 hour to 50 hours depending upon the particular composition of the organic compound starting materials, and a temperature range of from 1000° C. to 1300° C. and a pyrolysis time of between 2 and 10 hours are particularly preferred. As the inert gas, nitrogen is preferred. The inert gas should be supplied continuously during the reaction and removed continuously from the reaction vessel together with gas produced by the pyrolysis of the organic compound starking materials.

The basic structural components for the construction of the lithium secondary battery using the non-aqueous solvent of the present invention include an anode using the carbon material used in the present invention as the anode material, a cathode, a separator, a non-aqueous solvent and a container.

The methods for using the anode materials of the present invention are not particularly limited. For example, the powdered anode material may be mixed with a binder and, where necessary, a solvent. The electrode itself is then made by fashioning the above material into a sheet and then adhering it to a collector or by coating the above material directly onto a collector. In particular, various types of pitches may be used as the binder, and platelike electrodes obtained by pyrolyzing a mixture of these pitches with powdered anode material are preferred.

For the method of occluding lithium into the anode material of the present invention, any prior art method may be used. For example, lithium ion may be occluded into the anode material during charging.

There are no particular limitations on the cathode materials that may be used. However, such lithium containing oxides as $LiCoO_2$, $LiNiO_2$, $LiMnO_2$ and $LiMn_2O_4$; such oxides as $TiO_2$, $V_2O_5$, $MoO_3$ and $MnO_2$; such sulfides as $TiS_2$, $FeS$, and $MoS_3$; such selenides as $NbSe_3$; such conjugated polymers as polyacetylene, polyphenylene, polypyrrole or polyaniline may be used, and activated carbon may also be used. The methods of using these cathode materials in the cathode are not limited. However, as an example, the powdered cathode material may be mixed with a binder, a conductive material and, where necessary, a solvent. The electrode itself is then made by fashioning the above material into a sheet and then adhering it to a collector or by coating the above material directly onto a collector.

The selection of a separator is not particularly restricted, and microporous synthetic resin membranes and woven or non-woven cloth made from synthetic resin fiber or glass fiber or natural fiber may be used.

In the lithium secondary battery using a non-aqueous solvent of the present invention, an organic liquid electrolyte or a solid electrolyte may be used. As the organic liquid electrolyte, a solution of a lithium salt in an organic solvent with a high-dielectric constant may be used. With regard to the type of lithium salt that may be used, there are no particular limitations. For example, such lithium salts as $LiClO_4$, $LiPF_6$ and $LiSbF_6$ may be used. Additionally, it is possible to use more than one of these salts together when added in appropriate proportions. Appropriate organic solvents for use in the electrolyte are non-protonic solvents with high dielectric constants that are capable of dissolving lithium salts, and nitriles, carbonates, ethers, nitrocompounds, sulfur containing compounds, chlorinated hydrocarbons, ketones and esters may be used. More concretely, such solvents as acetonitrile; propionitrile; propylene carbonate; ethylene carbonate; diethyl carbonate; tetrahydrofuran; dioxane; 1,2-dimethoxyethane; nitromethane; N,N-dimethylformamide; dimethylsulfoxide; sulfolane and $\gamma$-butyrolactone used either alone or as mixed solvents in combinations of two or more are preferred.

In addition to stainless steel or nickel plated steel, the container may be made of a multi-layered material comprising synthetic resin and inorganic insulating membranes.

The lithium secondary battery of the present invention exhibits excellent characteristics in terms of capacity and the constant potential region of the anode. Capacity is one of the most important considerations in the field of batteries. The greater the capacity of a battery of a given size and weight, the longer and more effectively it can be used before replacement or, in the case of secondary batteries, recharging. Batteries with a pure lithium anode have a very high capacity. However, as mentioned above they are unsafe and unstable and generally unsuitable for sensitive applications in portable electronic equipment. Whereas several alternatives have been developed in the prior art that result in relatively safe and stable charge and discharge, as mentioned above, none of them come close to having sufficient capacity, in excess of 500 mAh/g, to be used effectively in portable electronic equipment. By producing a lithium secondary battery using an anode material having a capacity that in excess of 500 mAh/g, but that at the same time maintains the safe and stable charge and discharge characteristics of the prior art, the inventors have been able to provide an effective solution to the problem of a suitable anode material for lithium secondary batteries in portable electronic equipment and for other applications requiring stable high capacity rechargeable batteries.

Use of the anode material of the present invention additionally results in a very wide constant potential region in the charge - discharge curve. This means that the amount of lithium ion taken up by the anode materials of the present invention at a low and constant potential (between 0 V and 0.5 V with reference to lithium) during charging is relatively large which means that a larger portion of anode capacity contributes to overall battery capacity. This, in addition to the overall higher capacity of the anode material, results in batteries that are able to provide significantly more electricity at a stable voltage for a significantly longer time than those of the prior art. Prior art anode materials generally exhibit a constant potential region width of roughly 200 to 300 mAh/g as compared with the present invention constant potential region width of around 400 mAh/g.

Below, Examples of the present invention and Comparative Experiments are given and the results thereof are explained concretely and in detail. However, these are included for the purpose of explaining the present invention concretely and are not intended as limitations of the scope or the embodiments of the present invention.

Each of the analysis methods and analysis conditions used in the Examples of the present invention are described below. 1. Particle Size Distribution Measurement The equipment used was a Horiba, Ltd. LA-500 Laser Diffraction Type Powder Size Distribution Measuring Device. The measurement was performed by adding 3 drops of surface active agent to 100 ml of pure water, adding the sample to this mixture until it reached a set predetermined concentration. After the sample was subjected to ultrasonic sound wave dispersion for 10 minutes, the measurement was taken and the median diameter obtained was used as the average particle diameter. 2. Elemental Analysis A Perkin Elmer 2400 CHN type elemental analyzer was used to simultaneously determine the content of carbon, nitrogen and hydrogen. The analysis was made by precisely measuring out 1.5±0.2 mg of anode material into a tin vessel, and, after calibrating the equipment, heating the sample to a temperature of 975° C. for 5 minutes. The carrier for the gas generated by the heating of the sample was helium, and measurements were made by TCD. To establish correspondence between sample measurements and standard test values, the device was calibrated for the sample using acetanilide (2.0±0.1mg) as the standard.

A LECO TC-436 type oxygen - nitrogen simultaneous analysis device was used in the simultaneous analysis of oxygen and nitrogen. The analysis was made by precisely measuring out 10.0±0.5 mg of anode material into a nickel vessel, and, after calibrating the equipment, heating the sample in a graphite crucible by application of 4800 W of electricity. Using helium as the carrier gas, the gas generated by heating the sample was analyzed by infrared spectroscopy. To establish correspondence between sample measurements and standard test values, the device was calibrated for the sample using silicon nitride powder as the standard (manufactured by the Nihon Ceramics Association (Inc.) having a 1.67% oxygen content).

3. X-ray Photoelectron Spectroscopy Analysis

The equipment used was a V. G. Scientific ESCALAB MK-II. The analysis was performed using Mg-$K_\alpha$ as the x-ray source at 15 KV - 20 mA and using an Al slit (2 X 5 mm). Preparation for analysis consisted of placing the sample on double sided tape. Measurements were taken after argon etching of the sample surface. The analysis was performed by measuring each peak precisely within a narrow range after first measuring all of the peaks over a broad range, and identifying individual peaks. The charge up correction was made by setting the observed carbon 1s binding energy ("C-Is") at 284.4 eV and adjusting the value for each peak accordingly. 4. True Density Measurement True density was measured by the float-and-sink method using a bromoform - carbon tetrachloride mixture at 25° C.

5. NMR Spectra

The Equipment used was an $\alpha$400 made by Nippon Denshi Kabushiki Kaisha and measurements were taken at a frequency of 155.25 MHz. As the standard sample, a solution of LiCl dissolved in heavy water ($D_2O$) in an amount sufficient to bring the concentration of LiCl up to 1 mol/l was used. For sample preparation, using metallic lithium as the counter electrode and using $LiClO_4$ dissolved in a solvent composed of an equimolar mixture of propylene carbonate and 1,2-dimethoxyethane as the electrolyte, lithium was occluded into the carbon materials electrochemically using a current density of 1.0 mA/cm². After the material thus prepared was washed with solvent and died, it was placed in a $\phi$5ram NMR sample tube and the NMR spectra were taken.

EXAMPLE 1

One mole of naphthalene, 0.5 moles of HF, and 0.5 moles of $BF_3$ were mixed in an acid resistant autoclave with a 500 ml capacity, and, after the temperature was raised to 200° C. and the pressure of the gas was raised to 25 kg/cm², the reaction was conducted at this temperature and pressure over a period of two hours. Subsequently, nitrogen gas was introduced into the autoclave. This introduction of nitrogen gas also caused the recovery of HF and $BF_3$. By further removal of low boiling point components, a pitch with a softening point of about 115° C. was obtained. To 100 parts by weight of pitch obtained in this way were added 1000 parts by weight of 97% sulfuric acid and 1000 parts by weight of 62% nitric acid, and, after the temperature was raised to 70° C., this mixture was reacted for 2 hours at 70° C. The reaction products were filtered, washed in water and dried, and a nitrated pitch was obtained. The ratio of nitrogen atoms to carbon atoms contained in this nitrated pitch (N/C) was 0.14:1, and the ratio of nitrogen atoms to oxygen atoms (N/O) was about 0.34:1. This nitrated pitch was placed in an aluminum filament core (Nikkatoh Kabushiki Kaisha) inserted into an electric furnace (Siliconire Konetsu Kogyo Company, THS1060), and the material was heated under a stream of nitrogen gas at a rate of increase of temperature of 5° C./min until the temperature reached 1000° C. where it was maintained for 2 hours. Next, the material was cooled to room temperature and the black pyrolyzed material obtained was made into a powder using a ball mill (a "pot mill" made by Nihon Kagaku Togyo Kabushiki Kaisha). Again, the material was heated at 1000° C. under nitrogen for 2 hours and a powdered anode material was obtained.

The elemental analysis values for the anode materials obtained-above were carbon: 93.84wt%; hydrogen: 0.07wt% and nitrogen: 2.22wt%. In addition, using XPS analysis of the anode material, two peaks were observed based on N-1s at binding energies of 398.9 eV and 401.3 eV. The ratio of the intensity of the two peaks (the intensity of the 401.3 eV peak/the intensity of the 398.6 eV peak) was 2.8:1. Moreover, these two peaks accounted for 100% of all of the nitrogen atom bonds in the anode material.

1. Evaluation of the Anode Material

Eighty five parts by weight of the powder of the anode material obtained above was mixed with 15 parts by weight of powdered pitch possessing a softening point of 115° C. in a mixer (Product name: "Ken Mix Aiko" made by Kodaira Seisakusho, Ltd. ), and, after the powders were mixed until uniform, the mixture was fashioned by rolling into a sheet with a thickness of 0.3 min. From the sheet thus obtained, a test electrode with a 15 mm diameter was punched out. This test electrode was heat treated at 1000° C. for 2 hours under nitrogen gas to obtain a final sintered test electrode for use in the experimental evaluation of the anode material.

A half cell was prepared using this test electrode, using $LiClO_4$ dissolved in a solvent composed of an equal volume mixture of propylene carbonate and 1,2-dimethoxyethane (concentration of $LiClO_4$:1.0 mol/l) prepared as the electrolyte and using a separator made from a porous polypropylene membrane with a thickness of 50 micrometers. As the counter electrode, a 16 mm diameter, 0.5 mm thick disk of lithium metal was used. A small piece of lithium metal similar to the counter electrode was used as the reference electrode. The first cycle circuit potential of the half cell obtained above was 3.18V (volts). Subsequently, the half cell was charged at a current density of 1.0 mA/cm² until there was no change in the potential of the test electrode with respect to the reference electrode. Then, the half cell was discharged at a current density of 1.0 mA/cm², and by the time the potential of the test electrode with respect to the reference electrode reached 0.1 V, the observed discharge capacity was 279 mAh/g. By the time the electrode potential reached 0.5 V, the observed discharge capacity was 432 mAh/g and, finally, when discharging had proceeded sufficiently for the electrode potential to reach 3.0V, the observed discharge capacity was 583 mAh/g. The characteristics of the charge - discharge curve were excellent from the standpoint of flatness up to an electrode potential of 0.5V. 2. Evaluation of the Secondary Battery A test electrode with a thickness of 0.3 ram, a diameter of 15 mm and a weight of 90 mg made by the same methods as the above test electrode was used as the anode, and using LiClO$_4$ dissolved in a solvent composed of an equal volume mixture of propylene carbonate and 1,2-dimethoxyethane (concentration of LiClO$_4$:1.0 mol/l) prepared as the electrolyte and a porous polypropylene membrane with a thickness of 50 micrometers as the separator, a secondary battery was prepared. The cathode was made by mixing 85 parts by weight of LiCoO$_2$ with 10 parts by weight of acetylene black (conducting agent) and 5 parts by weight of polytetrafluoroethylene (binder) and compressing the mixture into a disk (weight 250 mg and diameter 14 mm).

The circuit voltage for the initial cycle of the secondary battery thus obtained was 0.03 V. When, after charging at a constant current until the charging voltage at a current density of 1.0 mA/cm$^2$ reached 4.10V, the battery was then discharged at a constant current with a current density of 1.0 mA/cm$^2$, an initial period discharge capacity of 34.9 mAh was obtained.

Subsequently, when a constant current charge - discharge cycle experiment was performed with the lower voltage limit set at 2.00V, the upper voltage limit set at 4.10V and the current density set at 1.0 mA/cm$^2$, discharge capacities of 34.2 mAh after 40 cycles, 34.0 mAh after 250 cycles and 33.7 mAh after 500 cycles were obtained. Up to 500 cycles, the average discharge voltage of the secondary battery was 3.6 V or more, and, moreover, a secondary battery prepared in the same way that, after 5 cycles, was subjected to a temperature of 60° C. for 20 days exhibited a self discharge rate of only 8%.

EXAMPLE 2

At a temperature of 180° C., 100 parts by weight of dinitronaphthalene were mixed with 100 parts by weight of the pitch with a softening point of 115° C. obtained in Example 1, after which the temperature of the mixture was raised to 270° C. The ratio of nitrogen atoms to carbon atoms contained in this pitch (N/C) was 0.05:1 and the ratio of nitrogen atoms to oxygen atoms (N/O) was 142:1. This compound mixture was ground to a powder in a ball mill, the black powder obtained was heated at 10000° C. for 2 hours under a stream of nitrogen gas, and a powdered anode material was obtained. The values for elemental analysis of this anode material were carbon: 95.79wt%, hydrogen: 0.01wt% and nitrogen: 1.67wt%. Two peaks based on N-1s with binding energies of 398.6 eV and 401.4 eV were observed by XPS analysis of the anode material. The ratio of the intensities of these two peaks (the intensity of the 401.4 eV peak/the intensity of the 398.6 eV peak) was 2.5:1, and the two peaks accounted for 100% of the total bonding involving nitrogen. In addition, when $^7$Li NMR spectra were obtained for lithium occluded into the sample to the extent of 372 mAh/g, a single peak was observed at 19.3 ppm. When the extent of the occlusion of lithium reached 500mAh/g, a peak was observed at 24 ppm with a shoulder peak at 35 ppm.

Moreover, when a half cell and a secondary battery were prepared as in Example 1 using the material prepared in this Example 2 and a charge - discharge experiment was conducted at constant current, essentially the same results were obtained as in Example 1.

EXAMPLE 3

A flexible shaped article for use as the test electrode was prepared by mixing 100 parts by weight of the powdered anode material obtained in Example. 1 with 5 parts by weight of polytetrafluoroethylene (binder) and compressing them into a round disk. Subsequently, a half cell was prepared by the same methods as in Example 1, and when the constant current charge - discharge experiment was conducted, the initial period circuit voltage was 3.18 V. By the time the electrode potential reached 0.1V, the discharge capacity observed was 237 mAh/g. By the time the electrode potential reached 0.5 V, the observed discharge capacity was 367 mAh/g and, finally, by the time the electrode potential reached 3.0 V, the observed discharge capacity was 496 mAh/g. This charge - discharge curve exhibited excellent flatness in the region of low electrode potential.

Moreover, when a secondary battery was prepared by the same methods as in Example 1 and a charge - discharge experiment was conducted using this battery at constant current, the initial period circuit voltage was 0.03V and the initial period discharge capacity was 29.7 mAh.

EXAMPLE 4

Thirty parts by weight of dinitronaphthalene were added to seventy parts by weight of tar (manufactured by Kawasaki Steel Company) at 150° C. and the temperature was raised to 500° C. while mixing the two together. The ratio of nitrogen atoms to carbon atoms contained in the resulting organic compound starting material (N/C) was about 0.05:1 and the ratio of nitrogen to oxygen atoms (N/O) was 1.57:1. This organic compound starting material was then ground to a powder using a ball mill and the black powder thus obtained was pyrolyzed for 2 hours at 1150° C. under nitrogen gas and a powdered anode material was obtained. The elemental composition of this anode material was carbon: 95.73%, hydrogen: 0.13% and nitrogen: 0.91%. Moreover, the results of analysis by XPS spectroscopy were two peaks which were confirmed to be based upon N-1s at binding energies of 398.6 eV and 401.4 eV. The relative intensity of the two peaks (the intensity of the 401.4 eV peak/the intensity of the 398.6 eV peak) was 2.5, and these two peaks accounted for 100% of all nitrogen bonding in the material. A half cell and a secondary battery were prepared using the same methods as in Example 1 and when charge - discharge experiments were conducted at constant voltage, essentially the same results were obtained as in Example 1.

Comparative Experiment 1

Except for the fact that the pitch obtained in Example 1 was not caused to undergo nitration, all of the same methods as in Example 1 were used to obtain a powdered anode material.

The values for elemental analysis of the anode material thus obtained were carbon: 97.80wt%, hydrogen: 0.05wt% and nitrogen: 0.08wt%. Moreover, the results of XPS analysis of this anode material did not reveal any observable peak based on the binding energy of nitrogen (N-1s).

A test electrode was prepared by sintering the carbon materials prepared in the shape of a test electrode just as in Example 1. Subsequently, using this test electrode, a half cell was prepared as in Example 1, and charge-discharge experiments were conducted at constant voltage. By the time the electrode potential reached 0.1 V, the discharge capacity observed was 105 mAh/g. By the time the electrode potential reached 0.5 V, the observed discharge capacity was 245 mAh/g and, finally, by the time. the electrode potential reached 3.0 V, the observed discharge capacity was 363 mAh/g, and overall discharge capacity was generally low. A secondary battery was prepared using the same methods as in Example 1, except for the use of the anode material obtained above, and, when charge - discharge experiments were conducted at constant voltage, the initial period circuit voltage was 0.03V and the initial period discharge capacity was 21.2mAh.

Comparative Experiment 2

PAN based carbon fibers (fiber diameter: 7 micrometers, fiber length: 160 micrometers) were placed in a ball mill and ground to a powder with an average particle diameter of 4.3 micrometers and then were heated at 1200° C. under a stream of nitrogen gas for 2 hours to obtain the powdered anode material.

The elemental values for the anode material thus obtained were carbon: 94.35wt%, hydrogen: 0.07wt% and nitrogen: 4.32wt%. Moreover, two peaks based on N-ls were observed by XPS analysis of the anode material at 398.9 eV and 401.1 eV. The ratio of the intensity of these two peaks (the intensity of the 401.1 eV peak/the intensity of the 398.6 eV peak) was 3.0:1. Moreover, the two peaks accounted for 100% of the total bonding involving nitrogen.

A sintered test electrode was made from the anode material thus obtained using the same methods as in Example 1. Using this test electrode, a half cell was prepared using the same methods as in Example 1. When the constant current charge - discharge experiment was performed using this half cell, the initial period circuit voltage was 3.20 V. By the time the electrode potential reached 0.1 V, the discharge capacity observed was 190 mAh/g. By the time the electrode potential reached 0.5V the the observed discharge capacity was 310 mAh/g and, finally, by the time the electrode potential reached 3.0 V, the observed discharge capacity was 402 mAh/g.

A secondary battery was prepared by the same methods as in Example 1 using this anode material, and, when the constant current charge discharge experiment was performed using this secondary battery, the initial period circuit voltage was 0.01 V. When measured as in Example 1, the initial period discharge capacity was 24.7 mAh.

Comparative Experiment 3

A flexible test electrode was made by the same methods as in Example 3 using the powdered anode material obtained in Comparative Experiment 2. A half cell was made using this test electrode by the same methods as in Example 1, and when constant current charge - discharge experiments were conducted, the initial period circuit voltage was 3.20 V. By the time the electrode potential reached 0.1 V, the discharge capacity observed was 162 mAh/g. By the time the electrode potential reached 0.5 V, the observed discharge capacity was 264 mAh/g and, finally, by the time the electrode potential reached 3.0 V, the observed discharge capacity was 342 mAh/g.

Moreover, when a secondary battery was prepared using this anode material by the same methods as in Example 2, the initial period circuit voltage was 0.01 V and the initial period discharge capacity was 21.0 mAh.

What is claimed is:

1. A lithium secondary battery using a non-aqueous solvent wherein the anode material is prepared by the pyrolysis of organic compound starting materials obtained by reacting at least one conjugated polycyclic compound with a nitrocompound or with a nitrating agent, the anode material containing at least the elements carbon and nitrogen; the nitrogen content ranging from 0.5% to 6% by weight and 80% or more of this nitrogen is bound to carbon by either C—N or C=N bonds; and the ratio of the intensity of the x-ray photoelectron spectroscopy ("XPS") peak observed for the anode material at 401.2±0.2 eV to the intensity of peak observed for the anode material at 398.8±0.4 eV is 1.0:1 or more.

2. A lithium secondary battery using a non-aqueous solvent according to claim 1 wherein the conjugated polycyclic compound is a pitch having a softening point of 170° C. or less or tar.

3. A lithium secondary battery using a non-aqueous solvent according to claim 2 wherein the nitrocompound is an aromatic nitrocompound.

4. A lithium secondary battery using a non-aqueous solvent according to claim 3 wherein the aromatic nitrocompound is dinitronaphthalene.

5. A lithium secondary battery using a non-aqueous solvent according to claim 1 wherein the anode material is prepared by pyrolyzing the organic compound starting materials at temperatures of from 800° C. to 1800° C. under an atmosphere of non-reactive gas, 6. A lithium secondary battery using a non-aqueous solvent according to claim 1 wherein the $d_{002}$ interlayer spacing of the pyrolyzed organic compound starting material is in the range of from 3.4 Å to 3.7 Å.

7. A lithium secondary battery using a non-aqueous solvent according to claim 1 wherein the crystallite size of the pyrolyzed organic compound starting material is 70 Å or less.

8. An anode material for a lithium secondary battery using a non-aqueous solvent prepared by pyrolyzing organic compound starting materials obtained by reacting at least one conjugated polycyclic compound with a nitrocompound or with a nitrating agent, the anode material containing at least the elements carbon and nitrogen; the nitrogen content ranging from 0.5% to 6% by weight and 80% or more of this nitrogen is bound to carbon by either C—N or C=N bonds; and the ratio of the intensity of the x-ray photoelectron spectroscopy ("XPS") peak observed for the anode material at 401.2±0.2 eV to the intensity of peak observed for the anode material at 398.8±0.4 eV is 1.0:1 or more.

9. An anode material according to claim 8 wherein the conjugated polycyclic compound is a pitch having a softening point of 170° C. or less or tar and the nitrocompound is dinitronaphthalene.

10. An anode material is sheet form for use in the preparation of anodes for a secondary battery, which anode material is prepared by pyrolyzing organic compound starting materials obtained by reacting at least one conjugated polycyclic compound with a nitrocompound or with a nitrating agent, the anode material containing at least the elements carbon and nitrogen; the nitrogen content ranging from 0.5% to 6% by weight and 80% or more of this nitrogen is bound to carbon by either C—N or C=N bonds; and the ratio of the intensity of the x-ray photoelectron spectroscopy ("XPS") peak observed for the anode material at 401.2±0.2 eV to the intensity of peak observed for the anode material at 398.8±0.4 eV is 1.0:1 or more.

11. An anode material in sheet form according to claim 10 wherein the conjugated polycyclic compound is a pitch having a softening point of 170° C. or less or tar and the nitrocompound is dinitronaphthalene.

* * * * *